United States Patent [19]
Nikkel et al.

[11] Patent Number: 5,524,525
[45] Date of Patent: Jun. 11, 1996

[54] ROTARY SERVO VALVE AND GUIDANCE SYSTEM APPARATUS FOR CONTROLLING THE SAME

[75] Inventors: Lee F. Nikkel; Eugene H. Schmidt, both of Madrid; Marlin W. Unruh, Grant, all of Nebr.

[73] Assignee: A.I.L. Inc., North Platte, Nebr.

[21] Appl. No.: 247,341

[22] Filed: May 23, 1994

[51] Int. Cl.⁶ .................................................... F01L 33/04
[52] U.S. Cl. ...................... 91/179; 137/270; 137/625.22; 251/290
[58] Field of Search ........................ 91/179, 180, 534; 137/270, 625.22; 251/290

[56] References Cited

U.S. PATENT DOCUMENTS

| | | |
|---|---|---|
| Re. 34,080 | 9/1992 | Schmidt. |
| 2,239,139 | 4/1941 | Allin ................................. 137/625.22 |
| 3,882,883 | 5/1975 | Droegemueller ........................ 137/270 |
| 4,285,366 | 8/1981 | Elser. |
| 4,469,342 | 9/1984 | Millard. |
| 4,579,040 | 4/1986 | Masuda et al.. |
| 4,848,402 | 7/1989 | Elser. |
| 4,858,650 | 8/1989 | Devaud et al. ..................... 137/625.22 |
| 4,977,816 | 12/1990 | Kuttruf. |
| 5,048,567 | 9/1991 | Noguchi et al.. |
| 5,107,752 | 4/1992 | Elser et al.. |
| 5,240,079 | 8/1993 | Schmidt. |

FOREIGN PATENT DOCUMENTS 48680  3/1982  European Pat. Off. .......... 137/625.22

Primary Examiner—F. Daniel Lopez
Attorney, Agent, or Firm—Greer, Burns & Crain, Ltd.

[57] ABSTRACT

A guidance control system for trailing implements attached to a tractor is disclosed. The system can function to steer the implement in a row crop, for example, and can also steer the tractor. A proportional servo valve having a rotatable spool is disclosed, which valve can be controlled to operate in an open center or closed center modes of operation.

20 Claims, 13 Drawing Sheets

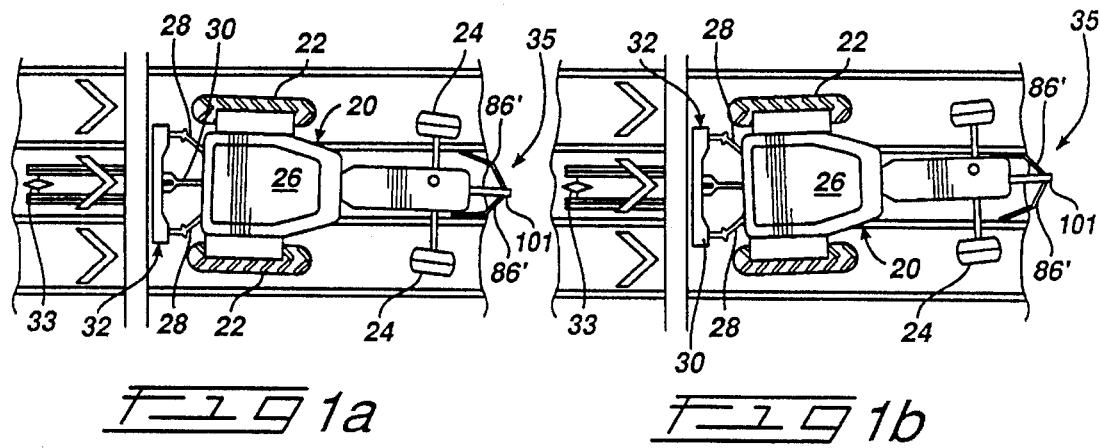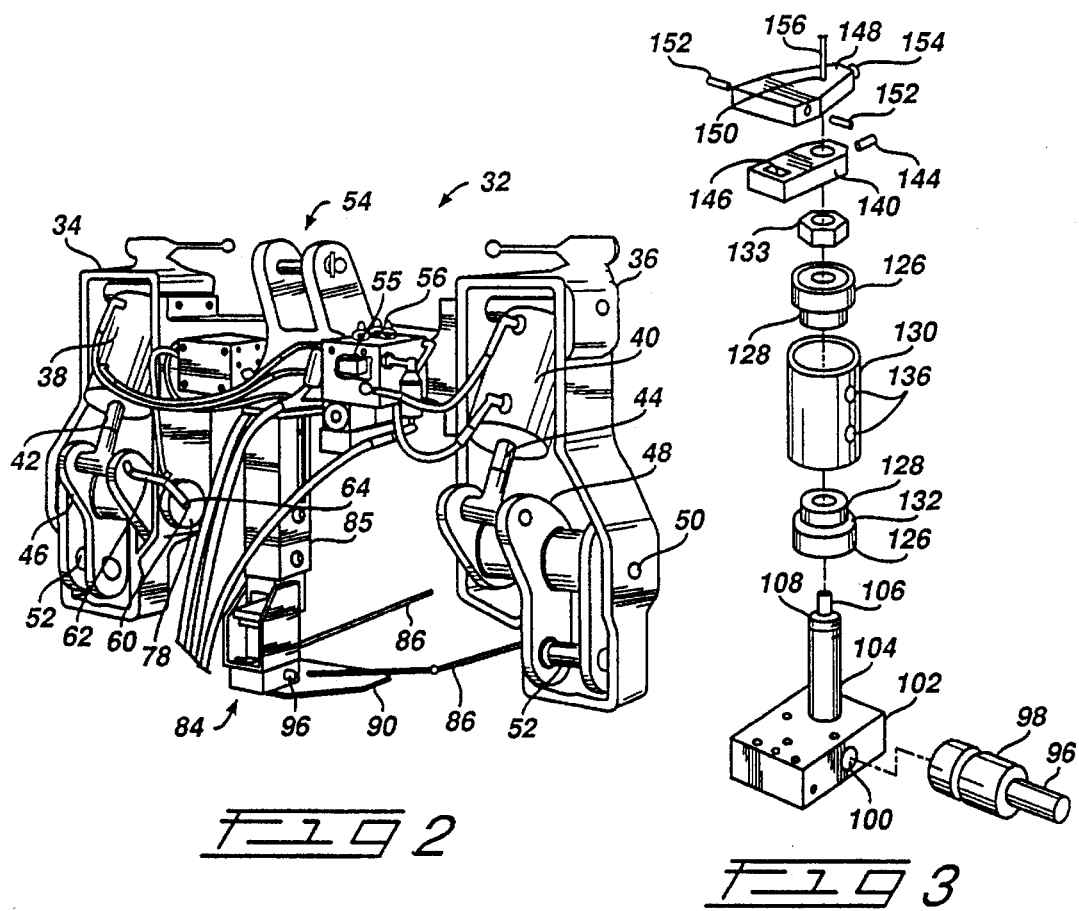

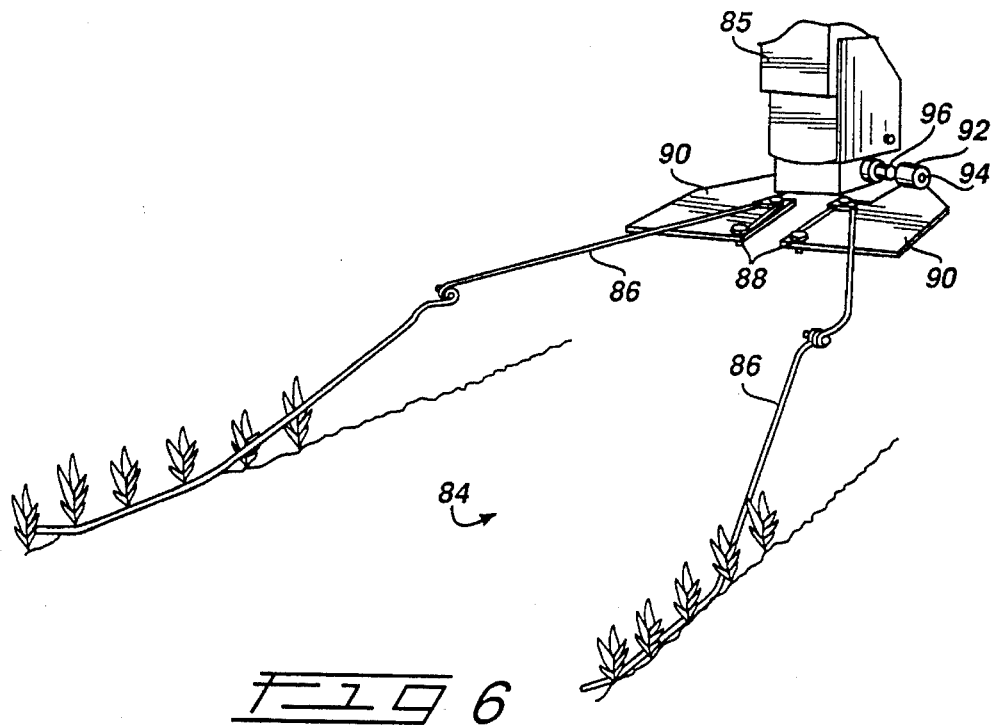
FIG 6
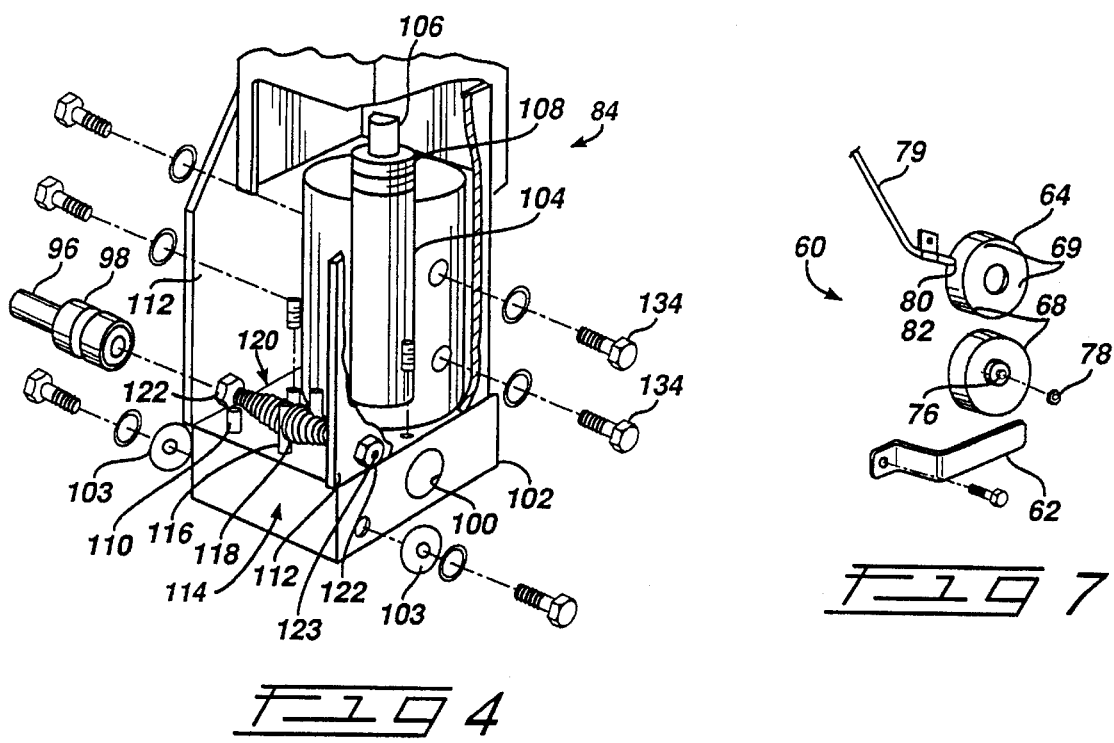
FIG 4
FIG 7

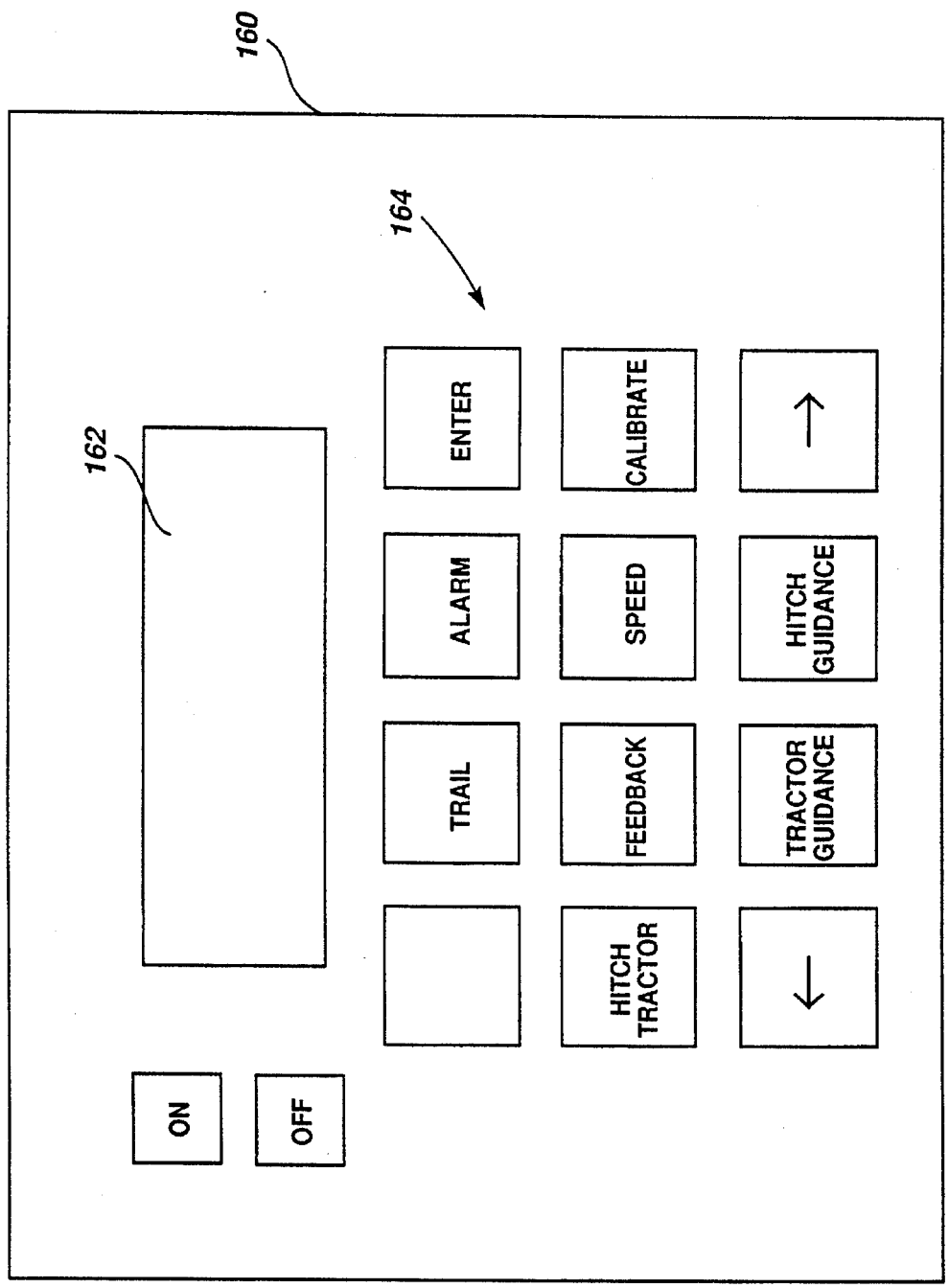

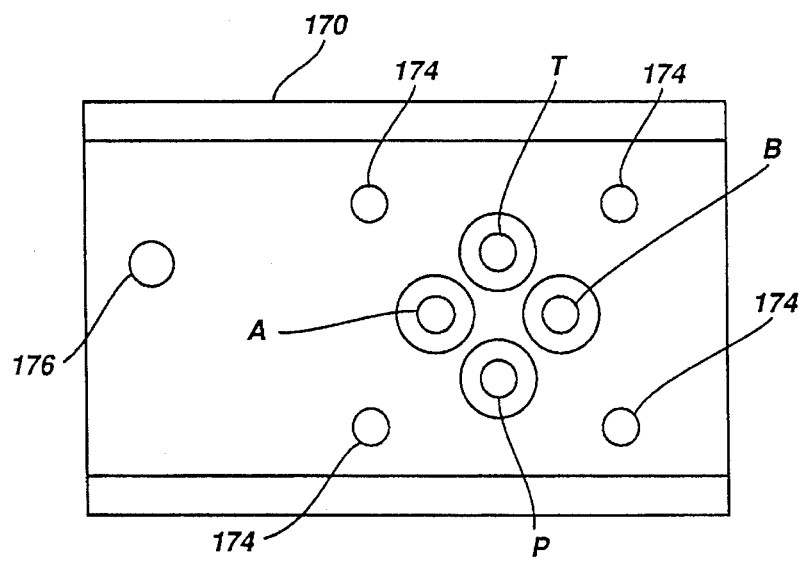
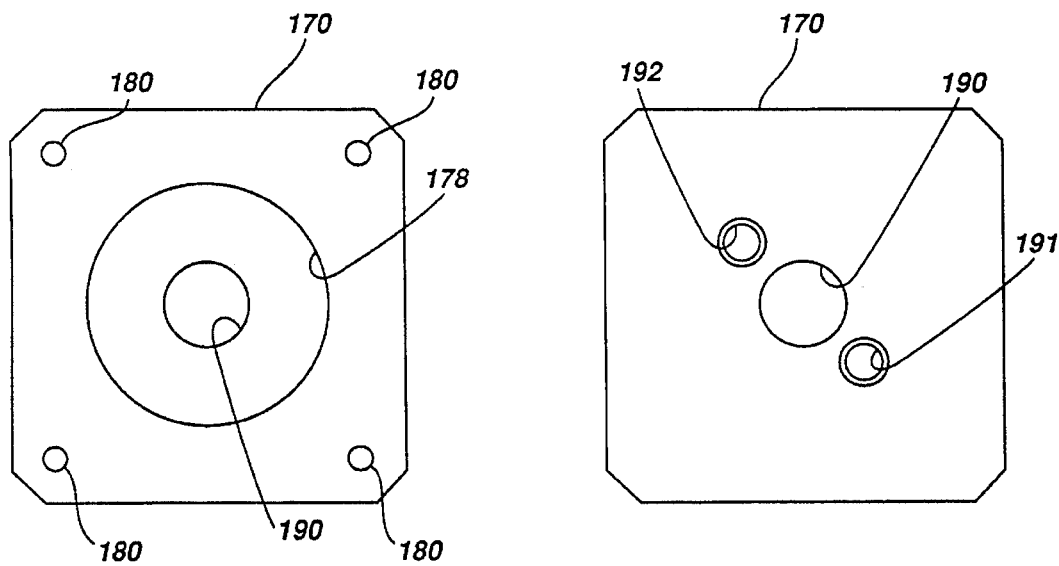

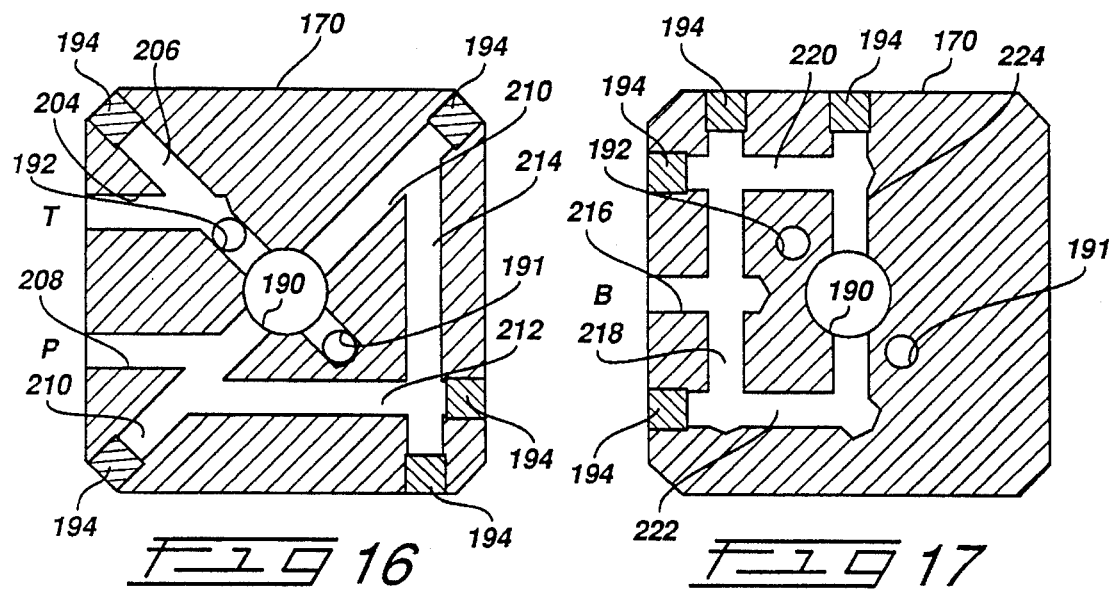
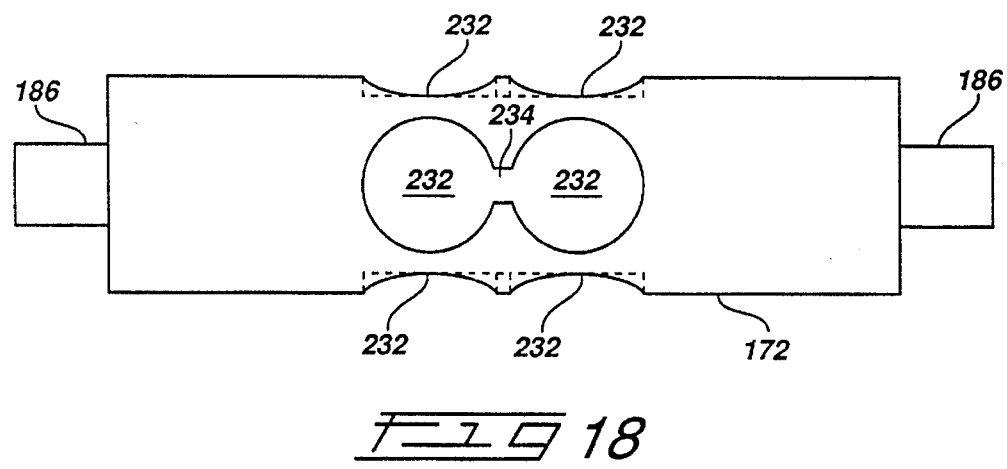

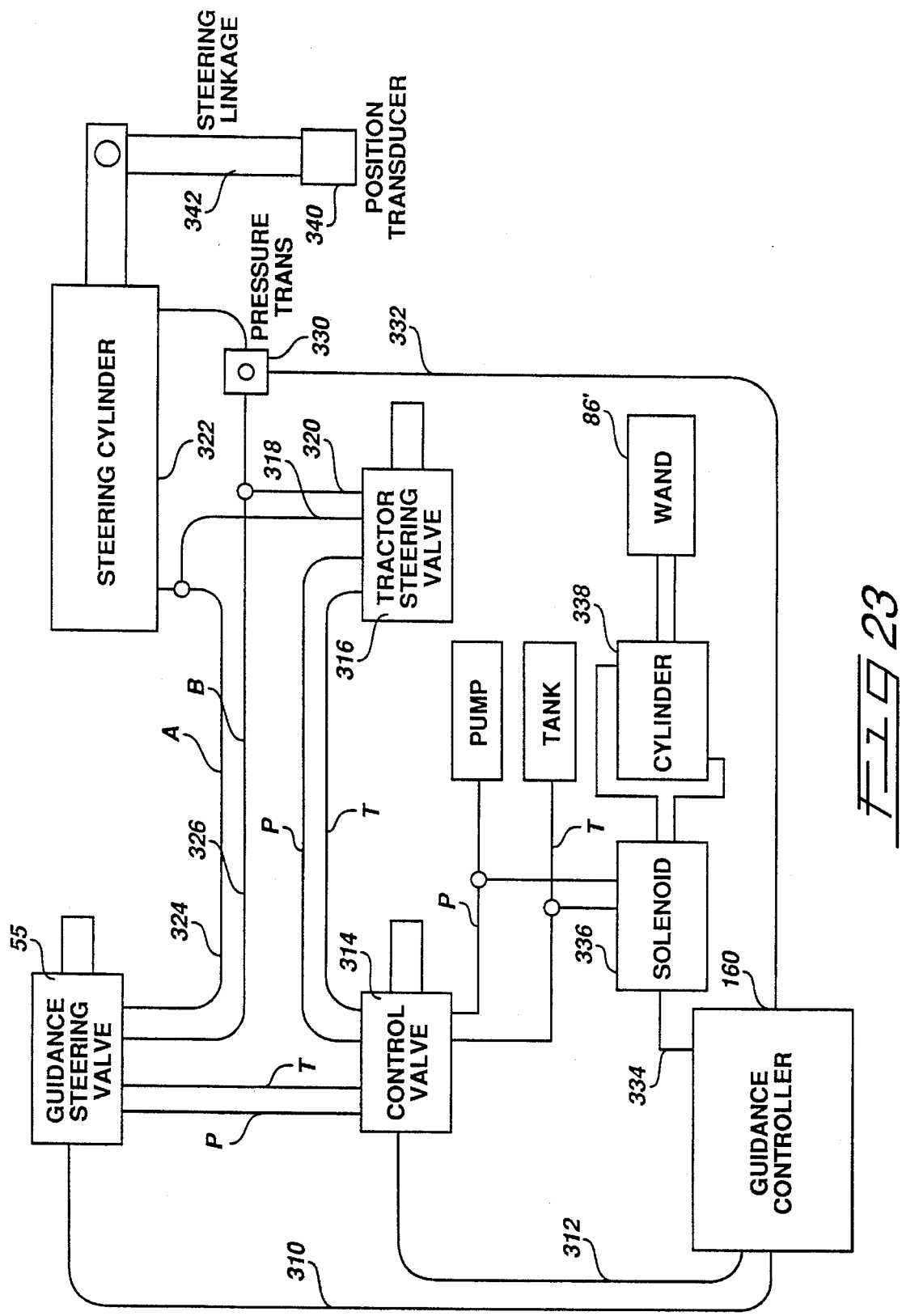

ROTARY SERVO VALVE AND GUIDANCE SYSTEM APPARATUS FOR CONTROLLING THE SAME

The present invention generally relates to proportional control valves for controlling the flow of fluid in a system. The invention also relates to apparatus for controlling the valve in an application using such a valve.

There continues to be a need for reliable proportional control valves for hydraulic control systems, as well as other fluid control systems, where fluid pressure and/or flow is capable of being directed through two different flow paths for controlling equipment, such as hydraulic cylinders, for example. While the type and number of such applications is large and the present invention is adapted to be applied to any number of such applications, the present invention is particularly useful in controlling systems that are used to provide guidance control of row crop and other farm implements that are drawn by tractors. It is well known in the art of tractors used for farming and other uses that the tractors have on-board hydraulic systems for controlling the implements that can be attached or drawn by the tractors, as well as the tractor operation itself. Such hydraulic systems now are used to control the angular position of the steerable wheels of the tractor, and often use a hydraulic cylinder to control a steering mechanism that steers the wheels. The operator of the tractor still turns the steering wheel, but the steering wheel often controls a proportional valve for controlling the flow of hydraulic fluid through the steering system, rather than being directly mechanically linked to the steerable wheels.

It is also well known that such tractor hydraulic systems generally have two possible flow paths which extend from a source of fluid pressure, typically a pump, through the hydraulic circuit, the direction of which is controlled by at least one valve. When fluid flows from the source through the first flow path, mechanical components are often moved in a first direction, and when the fluid flows from the pump through the second flow path, the mechanical components are moved in a second direction which is opposite from the first. Flow of fluid from the pump through the first flow path results in flow from the mechanical components through the second path to the tank, and visa versa. If the valve is a proportional valve, incremental control of the position of the mechanical components can be maintained. Such control is highly desirable in guidance control systems of drawn implements that are used in performing farming operations relating to row crops, for example, of the type which is disclosed in U.S. Pat. Re. No. 34,080.

Such hydraulic systems are generally characterized as being one of two types, which are often referred to as either open center or closed center types, both of which generally have two flow paths. An open center type of hydraulic system has hydraulic fluid flowing through the system generally continuously and the flow is directed proportionally through at least a portion of the two flow paths for the purpose of positioning the equipment components. In a closed center type of system, flow only occurs when the valve changes its position to change the amount of fluid in one path to change the position of the equipment components. When the desired position is reached, the valve will be returned to its center position, and further flow is terminated until the next valve change operation occurs. Both types of systems have been used on commercial tractors over the years, and each type of system requires a valve that is compatible with that system. Prior art valves are not known to have the capability of functioning in both types of system. It should therefore be understood that for such guidance control systems to be used with both types of hydraulic systems, it has been necessary for the appropriate valve be installed in the guidance system to operate properly. The obvious disadvantage of having two types of valves is that a seller would have to order guidance systems having each type of valve, or change-out the valves where the wrong one is supplied.

Accordingly, it is a primary object of the present invention to provide an improved proportional control valve and system for operating the same that has the advantage of being capable of operating with both open center and closed center hydraulic systems.

Another object of the present invention is to provide such an improved valve and control system that includes a processing means that can control the valve to operate in either an open center and a closed center hydraulic system.

Still another object of the present invention is to provide an improved valve which operates reliably and which is not prone to malfunction due to the presence of contaminants in the hydraulic fluid.

Another object of the improved valve lies in the provision of having a rotatable spool which controls the fluid flow through the valve and the hydraulic system. The design of the valve, including the rotatable spool greatly reduces the likelihood of a malfunction as compared with valves having a slidable spool design.

Yet another object of the present invention lies in the provision of utilizing a stepper motor attached to the valve which can rapidly rotatably control the angular position of the rotatable spool to achieve quick response and accurate operation of the valve during operation in a hydraulic control system.

Other objects and advantages of the present invention will become apparent upon reading the following detailed description while referring to the attached drawings, in which:

FIGS. 1a and 1b are greatly simplified top views of a tractor traveling down a row crop field and illustrating the operation of both a tractor guidance system as well as a guidance system for a trailing implement.

FIG. 2 is a perspective view of the front of a mount hitch that is attached to a tractor and to which the implement can be attached, and also illustrating a wand that extends rearwardly of the tractor when the mount hitch is installed on a tractor;

FIG. 3 is an exploded perspective of the structure of one of the wand position sensors utilized in the apparatus;

FIG. 4 is a partially exploded perspective of the wand sensor assembly and is an enlargement of a portion of the perspective shown in FIG. 2;

FIG. 5 is a front plan view of the operator console portion of the guidance system.

FIG. 6 is a perspective view of the structure of the wands and associated support structure;

FIG. 7 is an exploded perspective of a portion of the mounting hitch sensor which is also shown in FIG. 2;

FIG. 8 is a plan view of a portion of the valve embodying the present invention, and particularly illustrating the valve body;

FIG. 9 is an end view of the valve body shown in FIG. 8, as viewed from the left end thereof;

FIG. 10 is an end view of the valve body shown in FIG. 8, as viewed from the right end thereof;

FIG. 16 is another cross section of the valve body of FIG. 11, with the valve spool removed, and is taken generally along the line 16—16 shown in FIG. 11;

FIG. 17 is another cross section of the valve body of FIG. 11, with the valve spool removed, and is taken generally along the line 17—17 shown in FIG. 11;

FIG. 18 is a plan view of the valve spool shown in FIG. 11;

Figure 21A:
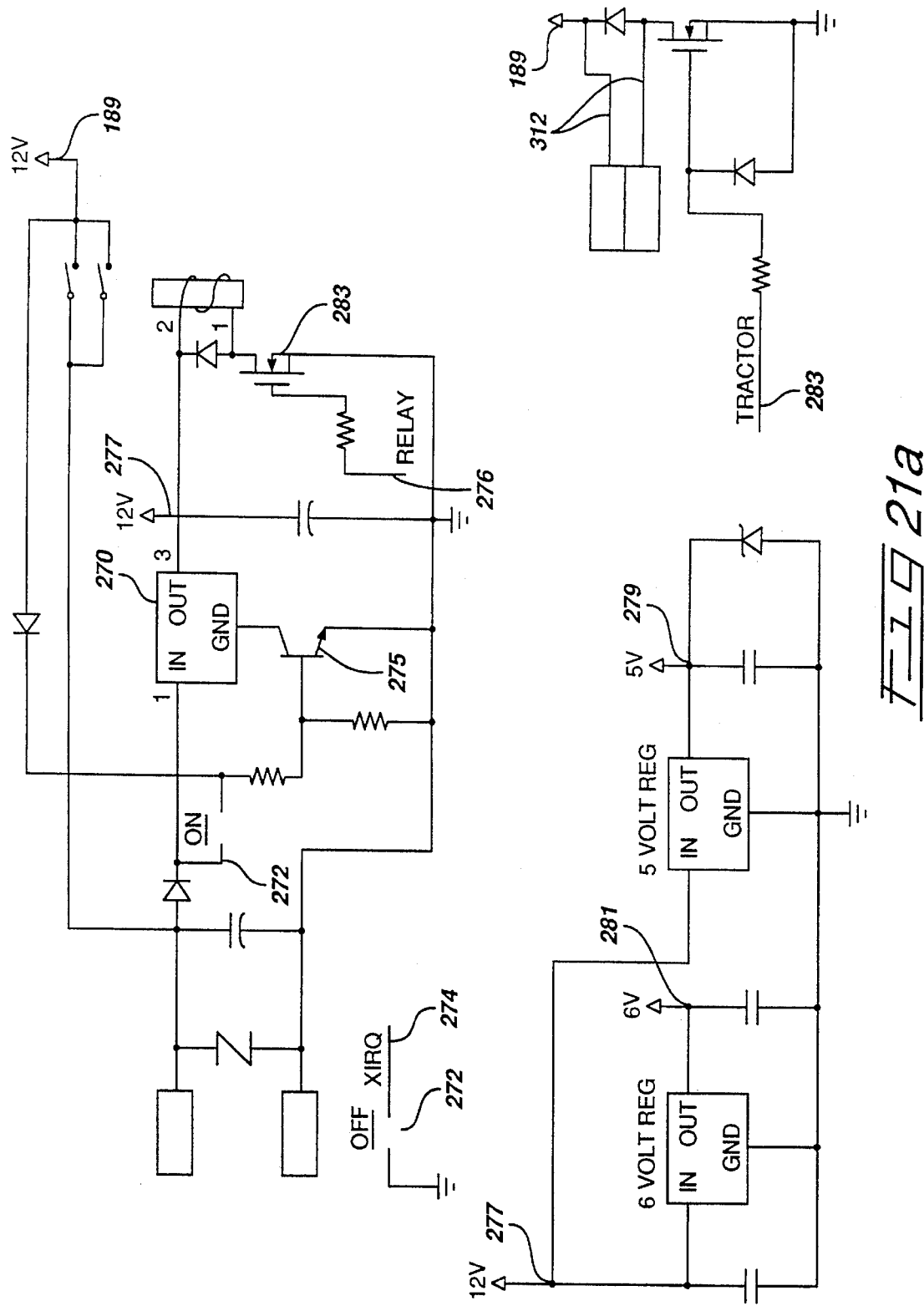
Figure 21B:
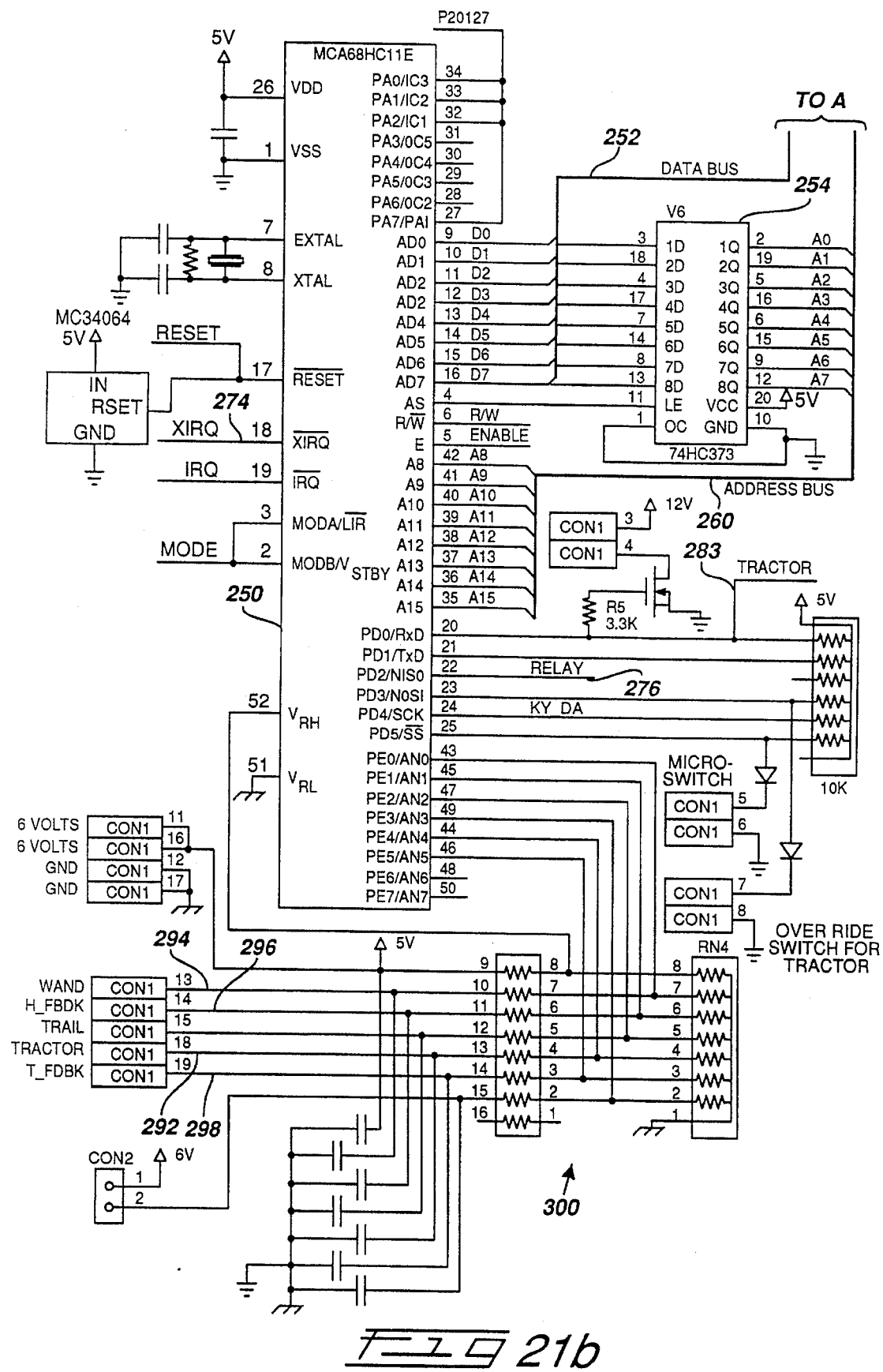
Figure 21C:
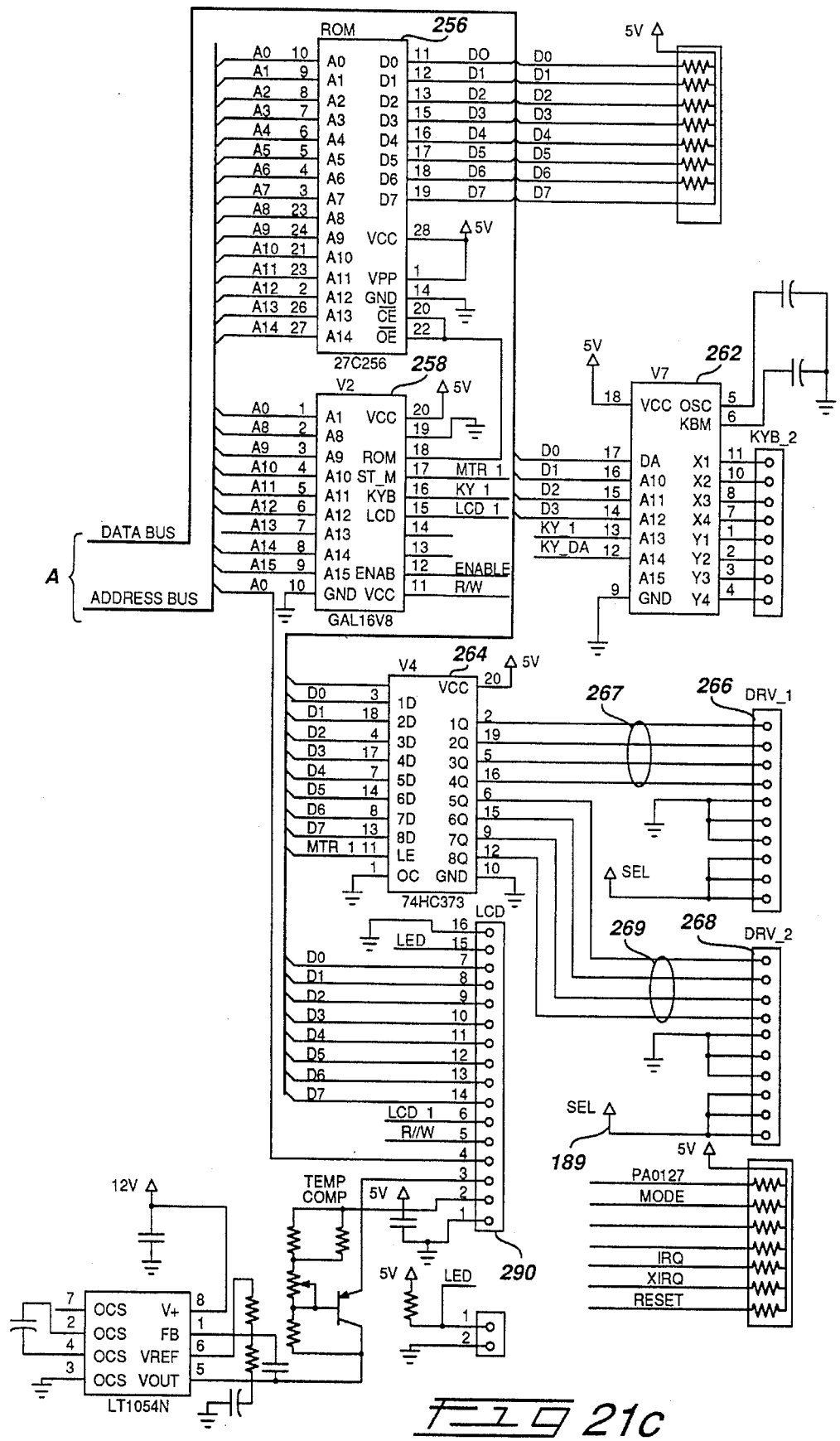
Figure 22:
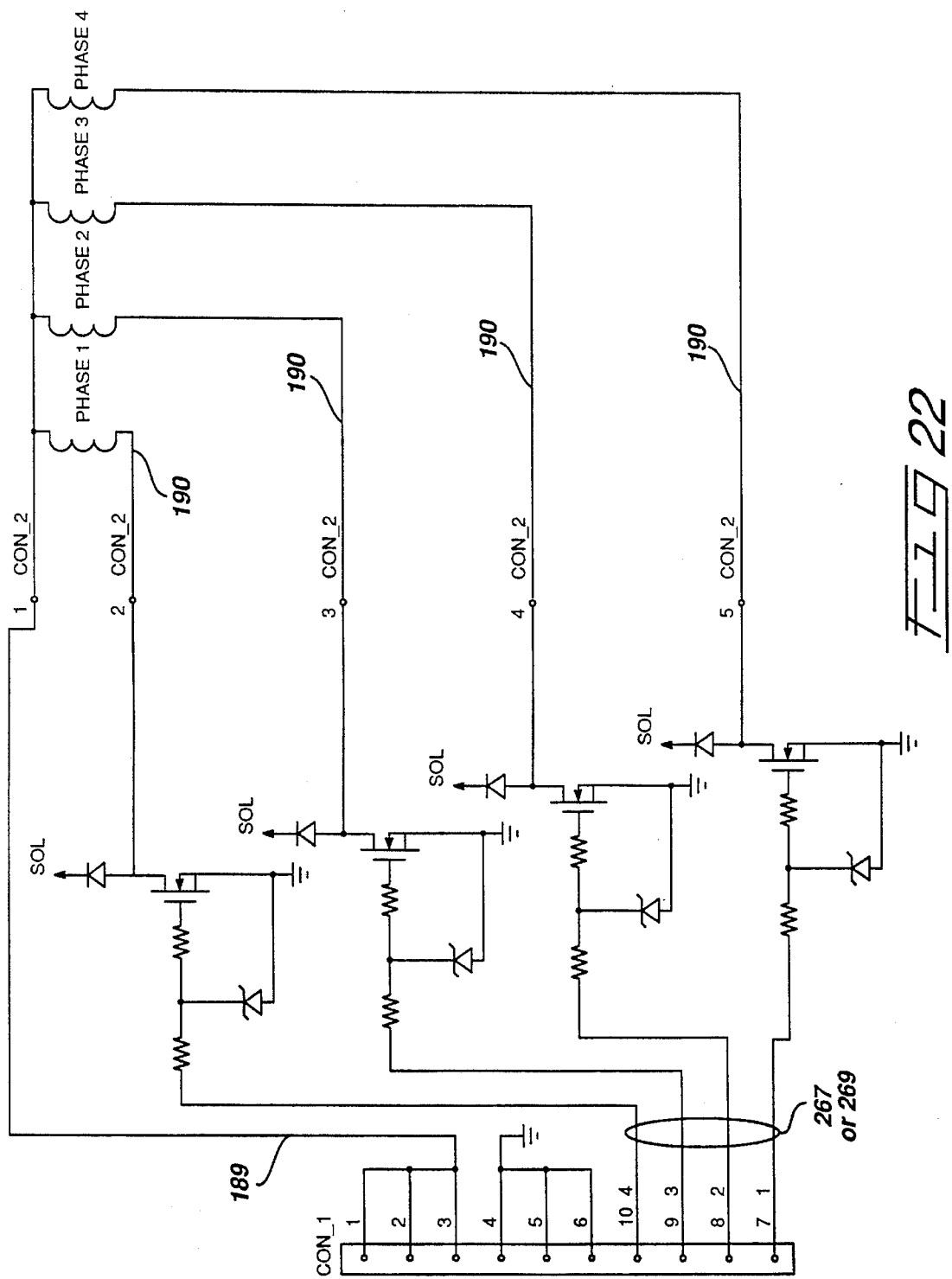

FIGS. 21a, 21b and 21c together comprise an electrical schematic diagram of the circuitry that is used to control the valve in a guidance control system for implements;

FIG. 22 is an electrical schematic diagram for circuitry that drives the stepper motor that controls the angular position of the valve spool of the valve; and, FIG. 23 is a block diagram of the hydraulic control system that is adapted to provide guidance for a tractor in addition to the trailing implement.

DETAILED DESCRIPTION

Broadly stated, the present invention relates to guidance systems for vehicles such as farm tractors, for example, as well as guidance systems for such vehicles in combination with a trailing implement, and to a rotary servo valve for use in such guidance systems.

While the rotary servo valve is particularly adapted for use in such guidance systems, it is a rotary servo valve that provides proportional output that is adapted for use in many differing applications in addition to guidance systems of the type described herein. It is also contemplated that the guidance control system can be used with vehicles other than farm tractors and can have general applicability to any vehicle that would utilize a mounting hitch to which some type of implement could be attached and where angular positioning of the implement is desired. The guidance control system can also be used to guide vehicles other than farm tractors, provided that there is a means for determining whether the vehicle is following the desired path.

With respect to farm tractors, they are adapted to follow the rows of a row crop and wand means can be used to follow the depression of the ground means where farm implements had made the rows. It should be understood that the present invention is not limited to the use of a wand structure for its operation. Any means for determining the desired path of the tractor or vehicle and generating electrical signals indicative of that desired path can be used, provided that the path corresponds to the rows of crops that the tractor is moving through. A sensing mechanism for locating the actual plants, either by physical contact or by photo sensing or the like can be used, provided that electrical signals that are comparable to the signals that are generated by the wand sensors are produced. Of course, the magnitude of the signals is not critical, for they can be scaled, but the informational content of the signals is necessary.

A guidance system of the type generally involved in the present application have been shown and described in prior U.S. Pat. Nos. 5,240,079, Re. 34,080 and 5,170,849.

The present invention is particularly useful in guiding implements that trail a tractor which has a 3-point tractor hitch to which a system hitch is mounted. The guidance system hitch is adapted to move in a manner whereby each side of the hitch may be extended or retracted with the extension of one side resulting in retraction of the other which changes the angle of the guidance system hitch relative to the angle of the tractor hitch. However, the present invention is also adapted to be used with implement guidance systems which has the implement move from side to side, i.e., a sliding type of operation, as well as pull hitch types of implement guidance systems which has the hitch attached to the tractor at a single location, and which have means for angularly adjusting the hitch relative to the tool bar of the implement. The rotary servo valve and the control system disclosed herein are adapted to be used with such pull type and sliding type systems.

The tractor itself may be steered along the row crop by the guidance system embodying the present invention, provided that a wand structure to be described is present. With respect to the system being used with a tractor-implement combination that is connected by a 3-point hitch which is also known as a quick hitch, the system can be operated in a center trailing mode where the implement is maintained in a center position as the tractor goes along a path. It should be understood that during operation in the row following mode, the guidance system requires that the sway blocks of the 3-point hitch be removed so that the implement can be free to move from side to side during operation.

The diagrammatic representations of FIGS. 1a and 1b also show a stabilizing disk 33 that is mounted to the implement and located some distance from the system hitch. This stabilizing disk penetrates the soil and acts as a fulcrum about which the implement can be turned. When the angle of the hitch 32 is changed, it slightly changes the angular orientation of the stabilizing disk 33 and causes the implement to be transversely moved during forward movement to bring the implement back to center along the desired path of movement. It should be understood that while it is preferred that a stabilizing wheel may also be used. It is possible that some implements may not require a stabilizing disk at all provided that the natural operational characteristics of the implement be such that the implement would tend to rotate in the same way as if a stabilizing disk were present.

Referring to the drawings, and particularly FIGS. 1a and 1b, a tractor is shown, indicated generally at 20, which has rear drive wheels 22, front wheels 24 for steering and a cab 26. Immediately behind the cab 26 is a 3-point tractor hitch comprised of outer draft links 28 and a center link 30 for mounting implements. The hitch of the guidance system, indicated generally at 32, is connected to the hitch links 28 and 30 of the tractor hitch and the implement is then attached to 3-points of the guidance system hitch. As can be appreciated from FIG. 1a, if the tractor is angled to the right relative to the direction of the rows as shown, the left side of the hitch 32 (the side near the top of the drawing) is extended with the right side retracted so that the angle of the guidance system hitch 32 is more perpendicular to the orientation of the rows. As is shown inn FIG. 1b, if the tractor is angled to the left relative to the rows, the right side of the hitch is extended while the left side is retracted and this also maintains a guidance system hitch in the generally perpendicular position. Regardless of whether the right or left sides of the hitch are extended or retracted, the center of the hitch has a relatively constant length during operation.

As is also shown in FIG. 1a and 1b, in addition to the guidance system providing guidance for the implement in the rear, it is also adapted to steer or guide the tractor itself during operation and to this end, a wand mechanism, indicated generally at 35, is shown attached to the front end of the tractor and this wand mechanism is adapted to enable the tractor to follow the rows in much the same manner as the wand mechanism used for the implement guidance. As will be hereinafter described, guidance of both the tractor and the implement can be simultaneously achieved with the present invention.

Broadly stated, the tractor guidance capability presumes that the tractor itself has a steering hydraulic cylinder that actually turns the wheels of the tractor and the steering cylinder is controlled by a steering valve that is controlled by the steering wheel and the tractor operator. When the tractor steering is controlled by the guidance system of the present invention, the tractor steering valve is effectively removed from operation and the steering cylinder is controlled by a separate guidance steering valve that is controlled by the wand structure 35 located in the front of the tractor. Thus, if the tractor starts to go off course, the angular position of the wand will change, thereby causing the guidance steering valve to be adjusted and cause the steering cylinder to correct the angle of the steering wheels to correctly align the tractor to accurately follow the rows.

As will be hereinafter discussed in more detail, if the tractor operator takes control of the steering wheel to override the guidance system control, as soon as he turns the steering wheel, the turning action will cause the tractor steering valve to operate as a pump, thereby increasing the pressure in one of the lines from the valve and this increase in pressure is detected by a pressure switch which immediately shuts off the guidance system tractor guidance operation and triggers actuation of a valve to lift the wands of the wand structure 35 out of contact with the ground. As will be also explained in detail, there is a switch console that the tractor operator can actuate which will also shut off the tractor steering functionality. This shut off operation also results in the wand structure 35 being retracted out of contact with the ground and/or plants since it is not being used in such event.

With respect to the guidance system hitch 32, it is illustrated in more detail in FIG. 2 which shows the hitch from the end which attaches to the tractor. The opposite side of the hitch which is not visible is the side to which an implement is attached. As viewed in FIG. 2, the hitch 32 has a left side casting 34 and a right side casting 36, which respectively contain left and right hydraulic cylinders 38 and 40. The cylinder 38 has an extendable piston and rod 42 and the cylinder 40 has a similar piston and rod 44. Each of the cylinders has an internal chamber in which the piston and rod can reciprocate as is well known. The rod extends outwardly of the cylinder and the portion of the chamber having the rod is referred as the rod end and the portion opposite the rod end is generally referred to as the blank end. Each of the pistons are connected to crank arms 46 and 48, respectively, each of which pivot around a shaft such as the right shaft 50. The crank arms 48 have a mounting pin 52 for attachment to the tractor hitch and a center clevis 54 also mounts to the third point of a 3-point tractor hitch.

The cylinders 38 and 40 are connected by hydraulic lines to a valve, indicated generally at 55, which is contained in a box 56, and the valve 55 is connected to the hydraulic system of the tractor. The hydraulic lines are connected so that extension of one cylinder 38 will result in displacement of fluid from one end of the cylinder and will cause a displacement in the opposite end of cylinder 40 and thereby produce a comparable retraction of its piston Movement of the pistons 42 and 44 rotate the crank arms 46 or 48 around their shafts, which by virtue of the connection with clevis pins 52, results in movement of one side or the other toward and away from the tractor to change the angular orientation of the guidance system hitch 32 relative to the tractor.

To measure the position of the crank arms and thereby the angular orientation of the guidance system hitch 32, a hitch angle sensor mechanism, indicated generally at 60, is provided and comprises a rotatable arm 62 that is connected to the crank arm and pivots around the sensor mechanism shown in FIG. 7. The sensor mechanism includes a stationary outer housing 64 which has an internal recess (not shown) in which a rotatable rotor element 68 is provided. This element has an outer diameter slightly less than the diameter of the recess and a thickness slightly less than the thickness of the recess so that it is free to rotate. The housing 64 is preferably secured to the side of the left casting 34 by suitable screws 69. The rotor element 68 has a small annular extension 70 which protrudes through a slightly larger diameter aperture 72 in the housing 64 and has the threaded aperture 76 to which a bolt 78 attaches the lever arm 62.

The housing 64 has an electrical conductor 79 extending therefrom which is connected to a Hall effect sensor 80 that comprises a sensor element which measures the change in magnetic flux relative to the head and generates a signal that is proportional to the magnitude of the flux. The rotor 68 has a relatively strong magnet 82 located in and affixed in a suitable recess with epoxy or other suitable material so that it is flush with the outer periphery. The magnet is of appropriate size, such as ¼×¼×0.6 inches, with opposite ends being magnetic north and south.

From the foregoing it should be understood that as the rotor 68 is turned by the action of the crank arm and the lever arm 62 is rotating, the Hall effect sensor 80 will detect changes in the rotation and generate an electrical output that is applied to the circuitry of the present invention by line 79. As previously mentioned, the guidance system includes the wand assembly 84 for use in guiding the implement, and also the wand assembly 35 for use in guiding the tractor. It should be understood, however, that the tractor guidance functionality does not have to be included in a guidance system which is used to provide guidance of the implement. However, because of the common use of much of the circuitry that is involved in both guidance functions, the tractor guidance functionality is achievable with only a moderate incremental increased cost. Similarly, it should be understood that if the primary desire is that of providing a tractor guidance capability, the system can certainly achieve that functionality without the provision of the implement guidance system. The spirit of the present invention is to provide both functionalities, but it should be clearly understood that both functionalities need not be practiced with the present invention.

As previously mentioned, the guidance system of the present invention includes at least one sensing device, such as is indicated generally at 84, in FIGS. 2, 4 and 6. As is shown in FIGS. 2 and 6, the wand assembly 84 is supported by a center housing 85, although it may be mounted laterally of the center by one or two rows if desired. In fact, if implements require use of a power take off interconnection from the tractor, the offsetting of the wand mechanism may be necessary for this use.

The wand assembly 84 has a generally wishbone shape and comprises two wand arms 86 which extend rearwardly of the hitch 32. These wands may be vertically adjusted and the spacing between them can also be adjusted to correspond with the width of the rows of the crop or the like. The distance between the two wands can be adjusted by varying the location of bolts 88 in several holes located in horizontally oriented plates 90 which preferably have an end portion 92 and a sleeve 94 which fit on a shaft element 96. The plates 90 are free to pivot vertically around the shaft 96. The shaft elements 96 have an enlarged end bushing portion 98 which are preferably forced fed into suitable apertures 100 located in a pivot block 102. The block also has off centered cam elements 103 suitably attached thereto which can be adjusted for the purpose of changing the angular orientation of the plates 90 when the implement is raised during traveling or turning around in a field. This results in the wand arms 86 being elevated as the implement is elevated.

With respect to the wand assembly 35 located in the front of the tractor for use in guiding the tractor itself, and referring to FIG. 1a, there is a forwardly extending support 101 that is bolted in a conventional manner to the front of the tractor and wand arms 86', substantially similar to arms 86, are provided for detecting whether the front of the tractor is becoming off-centered relative to the rows. The construction of the wand assembly 35 is generally similar to the assembly 84 except that the frame 101 preferably is elevated relative to the housing structure similar to 85 by a distance sufficient to place a hydraulic cylinder having one end attached to the frame extension 101 and the other attached to one or both of the plates 90 so that actuation of the cylinder will result in retracting the arms 86 out of contact with the ground or crops. This would occur when the tractor operator is steering the tractor manually or if the tractor guidance functionality were turned off.

The angular position of the wand arms relative to the guidance system hitch 32 or the angular position of the frame extension 101 relative to the wand arms 86' is detected by the structure to which the block 102 is mounted. This block 102 is adapted to rotate around a shaft 104 that is fixedly attached thereto and which has a reduced diameter end portion 106 and threads 108 adjacent thereto on the larger shaft portion. Referring to FIG. 4, the block 102 has end pins 110 freshly set in apertures thereof which, during rotation, limit movement thereof by these pins 110 contacting one or the other of the side plates 112. There is a spring biased centering mechanism indicated generally at 114 which returns the wands to the center position if they are not in contact with crops, rows or the like. This centering mechanism includes a pair of pins 116 to which washers 118 bear. A pair of springs 120 are provided which bear against the washers 118 and against respective nuts 122. The centering mechanism includes a shaft 123 having an enlarged center portion which fits between the pins 116 when the mechanism is centered. The shaft 123 extends through the side plates 112 and a threaded end portion is secured by a nut 124 on the outside. The center portion is larger than the inside diameter of the washers so that rotation of the block 102 results in the pins bearing against the washer on the side to which the block 102 is being moved and compress that spring. The center portion retains the other washer 118 and the spring associated with that side does not become compressed unless the block is pivoted in the opposite direction.

By adjusting the nuts 122 and 124, the bolt 123 can be moved in the axial direction which necessarily moves the center position. The rest position of the wands can thereby be adjusted. The shaft 104 is rotatable in a pair of bushings 126 which fit within a sleeve 130 with the annular face between the two diameter sections shown at 132, bearing against the respective ends of the sleeve 130. A nut 133 is threaded upon the threaded portion 108 to hold the mechanism together. The sleeve 130 is secured within the housing by threaded bolts 134 which extend through suitable apertures in the side plates 112 and engage threaded openings 136 in the sleeve.

To detect the angular position of the wands, and referring to FIG. 3, the elongated block 140 includes an aperture 142 which fits over the end 106 of the shaft 104 and is secured by set screw 144 that is threaded into an aperture (not shown) in the block 140. At the opposite end of the block 140 is a magnet 146 that is contained within a recess and is preferably the same size and type as the magnet 82. Thus, as the block 102 rotates with rotation of the wands 86, the block 140 similarly rotates and is in close proximity to a stationary block 148 that is secured by set screws 152 located on opposite sides within the housing 85. The far end of the block 148 contains an extension 154 which fits within an aperture in the rear face of the enclosure. By adjustment of the opposing set screws 152, the block 148 may be adjusted left and right relative to the pivot point defined by the end 106 for the purpose of centering a wand detection sensor (not shown but located on the underside of the block 148 at location 150. The wand detection sensor 150 is also preferably a Hall effect head which is located within a groove on the underside of the block 148 and the electrical conductor 156 from the Hall effect sensor extends upwardly to the electrical circuitry to be described. The same structure is also provided for the tractor sensor assembly 35 and it also has an electrical line from its Hall effect sensor which extends to the circuitry of the present invention.

The guidance system includes an operator console 160 shown in FIG. 5 which includes the circuitry of FIGS. 23 and 24. The operator console is preferably located in the tractor cab and it includes a liquid crystal display 162 for displaying information concerning the operation of the system and also includes a number of pushbuttons, indicated generally at 164 that are used to control the operation of the guidance system. The pushbuttons 164 include a FEEDBACK button which is used to control the amount of feedback that is used to provide correction signals that result in movement of the hydraulic cylinders 38 and 40 and in effect provide an increase or decrease in the influence of the sensor 60 signal relative to the signal generated by the wand assembly 84. The feedback switch determines the strength of the feedback signal which can be either increased or decreased for either the tractor or implement guidance function depending upon the state of the HITCH/TRACTOR button. The FEEDBACK button operates wherein if the operator depresses the button, it will increment or decrement its value for as long as the button is depressed. Once it is depressed again, it will move in the opposite direction until it is released, and the display 162 graphically illustrates the value. A HITCH/TRACTOR pushbutton toggles between a display function of either the tractor guidance functionality or the implement guidance functionality. This button is used to display the bias setting, calibration of the system, feedback and speed. A SPEED pushbutton is used to increase or decrease the speed of response, and it operates similar to the FEEDBACK button in that it will either increase or decrease the speed by incremental values as long as it is depressed. Upon subsequent actuation, it will adjust the speed in the opposite direction from the previous actuation. Once the setting is established, it can be entered by pressing the ENTER button. A CALIBRATE button is used to calibrate the system during initial set up. A TRACTOR GUIDANCE button is provided for turning the tractor guidance functionality on and off and a HITCH GUIDANCE button is provided for turning on the implement guidance functionality on and off. The CURSOR pushbuttons are used for making corrections in the levels or settings of the system including bias, for example.

As previously mentioned, the valve 55 that is located within the enclosure 56 is adapted to provide proportional control to the cylinders 38 and 40 so that there can be incremental correction of the angular position of the hitch 32 during operation. As is shown in FIG. 2, the cylinders 38 and 40 have hydraulic lines extending from the enclosure 56 to opposite ends of the cylinders and the lines extending to each cylinder are connected to communicate with the interior of the cylinder on opposite ends of the piston in the conventional manner. The piston is in turn connected to the rod 44 so that as flow of fluid into one end of the cylinder will cause the piston to move in the opposite direction and the cylinders 38 and 40 are connected in a manner whereby extension of the rod 44 relative to the cylinder 40 causes a retraction of the rod 42 relative to cylinder 38.

The flow in the hydraulic lines is controlled by the valve 55 which comprises a unitary block 170 shown in FIGS. 8–18 and it houses a rotatable spool, indicated generally at 172 shown in FIGS. 11, 18, 19 and 20. The body 170 shown in FIG. 8 is preferably made from cast aluminum although it can be stainless steel or the like. It has a plurality of internal ports (to be hereinafter identified) that are drilled from various surfaces, some of which intersect other drilled ports. Many of the drilled ports are then plugged at the outer surface of the body 170.

Referring to FIG. 8, there are four outlet ports marked T, P, A and B, which extend via hydraulic lines to the tank, pump, A and B lines, respectively. The A and B lines extend to the cylinders 38 and 40, with A and B being connected to opposite ends of each cylinder in the manner previously described. The tank is the reservoir of hydraulic fluid within the system and the pump is indicative of the source of hydraulic pressure. There are four other apertures 174 which extend through the body 170 without intersecting any of the internal ports and these apertures are used to mount the valve body within the enclosure 56. A larger aperture 176 is provided near the end for extending electrical lines to the interior of the body which contains a larger diameter recess 178 as shown in the end view of FIG. 9.

A number of tapped holes 180 are provided for mounting a stepper motor 182 (see FIG. 11) that has a drive shaft 191 that is connected to one of two reduced diameter end portions 186 of the spool 172 by a coupling 188. The stepper motor 182 is adapted to be controlled by electrical signals applied via lines 189 from the controller and the stepper motor's output shaft is adapted to angularly position the spool 172 to direct the flow of fluid proportionally between ports A and B.

Figure 11:
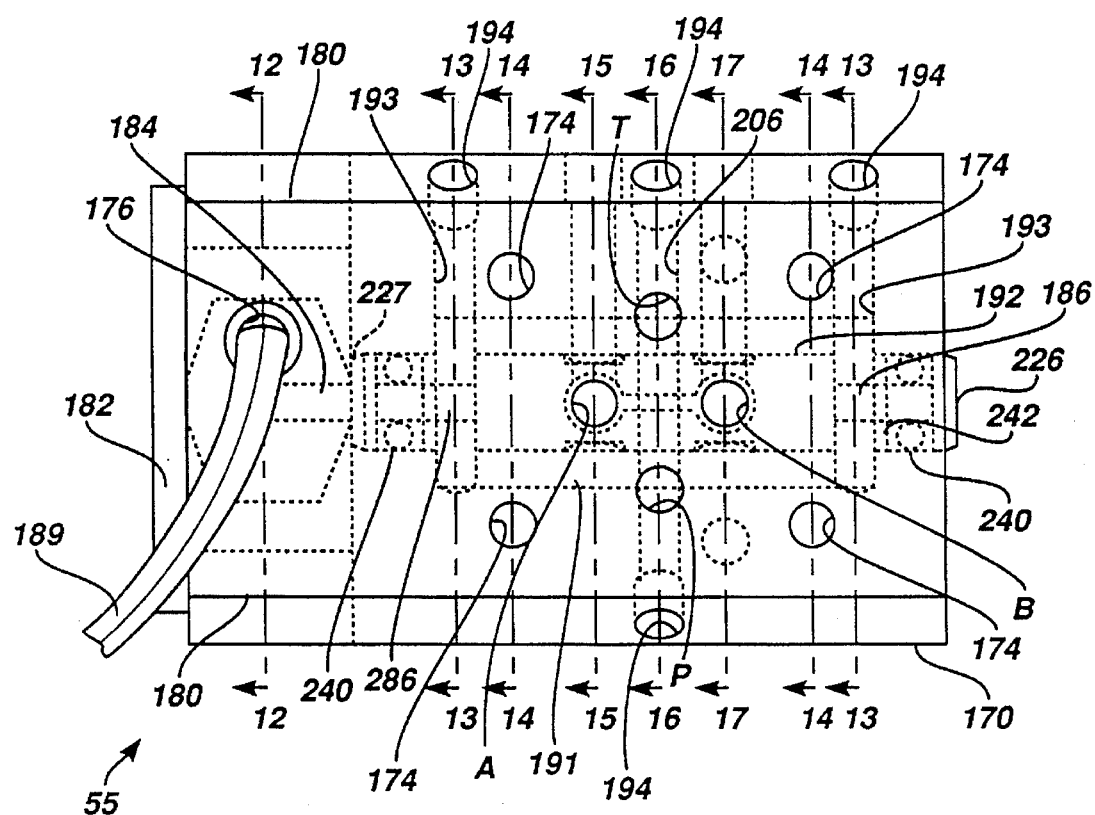
FIG. 11 is another plan view of the valve embodying the present invention, similar to FIG. 8, but illustrating internal ports and the valve spool.

The body 170 has a central aperture 190 in which the spool is located and this aperture extends the full length of the body 170 as is indicated by FIGS. 9 and 10. Parallel to the aperture 190 are a pair of drilled ports 191 and 192 which are parallel to and at approximately a 45° angle relative to horizontal and these ports extend from the right end approximately ¾ of the length of the body as shown in FIG. 11. The lengthwise oriented ports 191 and 192 comprise the extent of the ports that are drilled in the lengthwise direction, but there are many other ports that are drilled in a direction perpendicular to the lengthwise direction and these ports are shown in FIGS. 12–17 which are cross sections of the valve body shown in FIG. 11.

Figure 12:
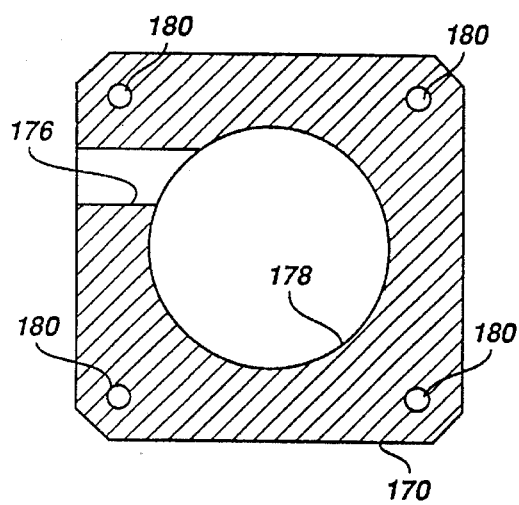
FIG. 12 is a cross section of the valve body of FIG. 11, with the valve spool removed, and is taken generally along the line 12—12 shown in FIG. 11.
Figure 13:
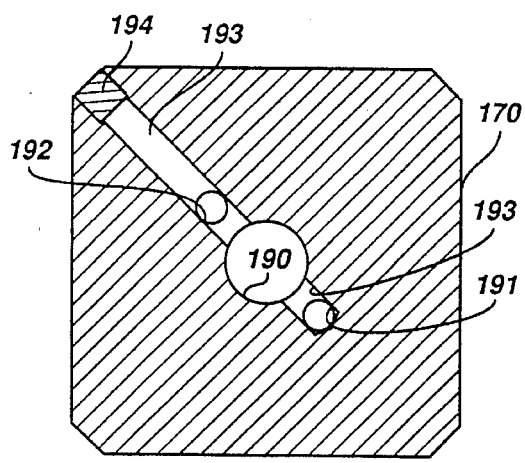
FIG. 13 is another cross section of the valve body of FIG. 11, with the valve spool removed, and is taken generally along the lines 13—13 shown in FIG. 11.
Figure 14:
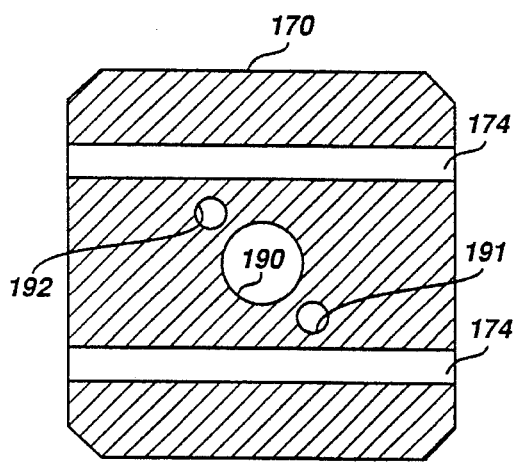
FIG. 14 is another cross section of the valve body of FIG. 11, with the valve spool removed, and is taken generally along the lines 14—14 shown in FIG. 11.

With respect to the cross section of FIG. 12, it illustrates the opening 176 as well as the recess 178 in which the stepper motor is mounted. Referring to the cross section taken generally along the line 13—13, an angular port 193 is provided which intersects the port 192 as well as the opening 190 and it also extends to the port 191. A plug 194 is placed at the outer surface thereof and this is preferably a slightly larger diameter portion that is suitably threaded so that the threaded plug 194 can be inserted and seated at the interface between the enlarged portion and the port 193 to provide a seal so that hydraulic fluid cannot escape. There are many other plugs 194 illustrated in FIGS. 14–18 as well as in FIG. 11. With respect to FIG. 14, which is a cross section taken at two locations shown along lines 14—14 of FIG. 11, this cross section merely shows the apertures 174 which are drilled through the body and which do not communicate with the internal ports of the structure. The apertures 174 are used for mounting the valve body to a mounting surface.

Figure 15:
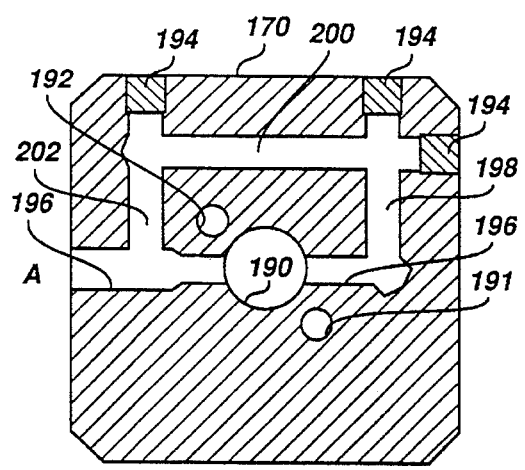
FIG. 15 is another cross section of the valve body of FIG. 11, with the valve spool removed, and is taken generally along the lines 15—15 shown in FIG. 11.

With respect to FIG. 15, it is a cross section taken generally along the line 15—15 which illustrates the intersection of ports for providing the A outlet port. The A outlet port is created by a port 196 that extends to and through the aperture 190 where it intersects with a vertical port 198 which communicates with a port 200, which in turn communicates with port 196 by another vertical port 202. Thus, the A port is in communication with opposite sides of the spool when the spool is inserted in the opening 190.

With respect to FIG. 16, it shows the outlet port T being comprised of a port 204 that extends to an angled port 206 which also extends to and through the opening 190 and communicates with the longitudinal ports 191 and 192. The P outlet port is comprised of a port 208 that intercepts an angled port 210 which in turn communicates with ports 212 and 214 which intercept one another. With respect to FIG. 17, it defines the output B port which is provided by a port 216 which communicates via a vertical port 218 to an upper horizontal port 220 and a lower one 222 which intercepts a vertical port 224 that extends through the opening 190 and provides communication to opposite sides of the opening 190.

With respect to the construction of the spool 172 shown in FIGS. 11 and 18, it is generally circular in cross section and has reduced diameter ends 186. The spool also has a plurality of flats 232 that are preferably milled into the surface of the spool 172, there being four pairs that are offset 90° relative to adjacent pairs, each of the pairs having a bridging portion 234 cut away so as to provide communication between adjacent flats. When the spool 172 is inserted in the body 170, an end sealing cap 226 is provided for preventing escape of fluid out of the right end of the body 170. A similar sealing cap 227 is located on the other end 186, but it has an opening through which the output shaft 184 can pass.

It should be understood that the operation of the valve with respect to the movement of fluid through the various A, B, P and T is accomplished by the interaction of the valve spool with the ports that are shown in the cross sections shown in FIGS. 15, 16 and 17. The ports 191, 192 communicate with one another via ports 193 and the reduced diameter 186 of the spool 172 itself. This has the effect of providing an outer reservoir of fluid around the ends of the spool 172 which provides a generally equalizing pressure influence on the spool 172, it being understood and appreciated that there will be some marginal flow of fluid from the P port along the interface between the outer diameter of the spool 172 and the interior aperture 190 of the body. The spool 172 is also supported by a pair of ball bearings 240 that are sized to fit on the reduced diameter end portions 186. The right most ball bearing is adapted to fit between a collar 242 that is frictionally fit on the reduced diameter portion 186 and the sealing cap 226. The ball bearings are lubricated by the fluid that is communicated through ports 191, 192 and 193.

While the size of the body 170 and the rotatable spool 172 is not critical in and of itself, the capability of the valve to operate in both an open center and closed center mode of operation requires that there be some important dimensional considerations in the relative sizes of some of the ports that are provided in the body 170 and the spool 172. To this end, the outer diameter of the spool 172 is on the order of approximately ½ inch and the square outside of the body 170 is on the order of approximately 2½ inches. Given these general dimensions, the size of the ports A and B are smaller than the size of the ports which define the T and P ports. Thus, in this regard, the size of the port 196 at the location immediately adjacent the aperture 190 is preferably 0.187 inch in diameter, as is the diameter of the B port at the location immediately adjacent the aperture 190, i.e., the port 224 also has a diameter of preferably 0.187 inch. The diameters of the apertures 228 and 230 are preferably 0.187 inch in diameter to be substantially identical to the diameter of the ports 196. With respect to the ports T and P, the diameters of port 206 immediately adjacent the aperture 190 as well as the port 210 immediately adjacent the aperture 190 are slightly larger and are preferably 0.203 inch in diameter. The difference between the sizes of the ports T and P relative to A and B is on the order of approximately 15/1000ths of an inch and this difference is important in providing the capability of operating in an open center mode of operation as well as a closed center mode of operation. The diameter of the flats 232 is preferably 0.312 inch. It should be understood that the exact dimensions that are set forth above with respect to the diameters of the ports and of the flats are known to function well. It should be understood that the dimensions can be changed as long as the different sized ports are used to accomplish the open center versus closed center modes of operation.

In accordance with an important aspect of the present invention, the initial positioning of the spool 172 within the body 170 effectively controls whether the valve will operate in an open center mode or a closed center mode. The structure of the valve is such that if it is rotated 45°, for its baseline operation, it will change between open center and closed center modes of operation. In this regard, the angular position of the spool 172 is offset 45° relative to the two operating mode positions, and in each position, there is a nominal center position, whereby no flow can occur in the closed center operating mode position, and where flow will be balanced in the open center operating position.

Figure 19:
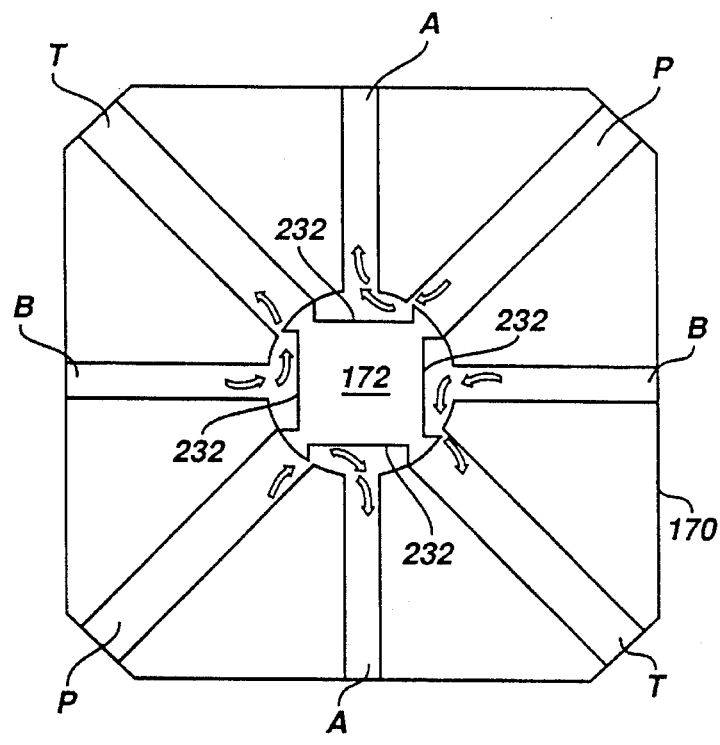
FIG. 19 is an end view of a valve construction that is functionally equivalent to the valve construction shown in FIGS. 8 through 18, and illustrating the operation of the valve in the open center mode of operation.
Figure 20:
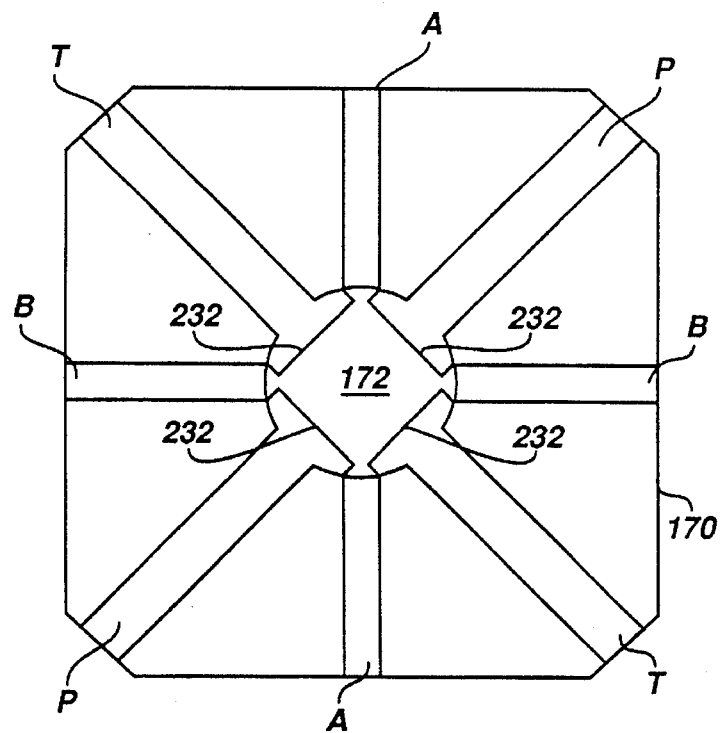
FIG. 20 is an end view of a valve construction that is functionally equivalent to the valve construction shown in FIGS. 8 through 18, and illustrating the operation of the valve in the closed center mode of operation.

The theory of operation of the valve is shown in the greatly simplified drawings shown in FIGS. 19 and 20, which schematically illustrates the ports identified as A, B, P and T within the valve body 170 and the spool 172 is located within the aperture 190. It should be understood that the internal ports that are shown in FIGS. 11 through 17 are essentially eliminated in FIGS. 20 and 21 in favor of the diagrammatic illustration which merely shows the ports 6 standing straight outwardly to the sides of the body 170. With this illustration, there are two outlet ports A, for example, rather than the internal porting which interconnects ports located on opposite sides of the aperture 190 and provides a single outlet A. Pairs of ports P, T and B are similarly illustrated. It should be appreciated that ports P and T are shown to be located on opposite sides of the opening 190 perpendicular to one another just as is the actual construction shown in FIG. 16. Also, the relationship of ports A to B are the same as are shown in FIGS. 15 and 17 cross sections and the relationship of A and B is one of perpendicularity relative to one another and both A and B ports are offset 45° relative to the P and T ports. The flats 232 of the spool 172 are also illustrated.

The illustration of FIG. 19 is for an open center mode of operation. The spool 172 is positioned so that the lands are in position to close the ports P as much as possible, but the extent of the land surface 242 is not sufficiently wide to fully cover the port P diameter and flow of hydraulic fluid continues from P port to the A port both at the upper side of the spool and at the lower side of the spool 172 as shown by the arrows indicating flow out of the port A. In the present guidance system, hydraulic lines extend from port A to the hydraulic cylinders 38 and 40 and cause flow to move in the opposite direction in the line connected to port B which also causes flow through the valve to port T and to the tank. It should be appreciated that if the spool 172 were rotated slightly counterclockwise so as to block the flow from port P to port A, then it would result in flow from port P to port B and from port A to port T. The above described operation results from the land surfaces 242 not being large enough to completely cover the relatively larger internal ports P and T compared to ports A and B.

For the close center mode of operation, the land surfaces 242 are the same size as the diameter of the ports A and B and therefore when the spool is positioned as shown in FIG. 20, there is no flow through any of the ports. As soon as the spool is moved either in the clockwise or counterclockwise direction from its nominal centered position, there will be resulting flow from the pump to either of ports A or B and that will result in flow from port B or A respectively to port T.

Turning now to the electrical circuitry that is contained within the control panel 160, it is shown in FIGS. 21 and 22. The circuitry includes a microprocessor 250 which is preferably a Motorola Model MC68HC11E1. The microprocessor has a data bus indicated at 252 which contains eight data lines identified as D0–D7 which extend to a demultiplexer 254 for providing address lines A0–A7 for addressing a read only memory 256 as well as a decoding integrated circuit 258. Address lines A8–A15 are controlled directly from the microprocessor 250 on lines 260. The keyboard for the controller is identified at 262 and is connected to data lines D0–D3 of the databus and has KY_1 line connected to the same identified line which is pin 16 of the decoding integrated circuit 258. Pin 12 identified as KY_DA is connected to pin 24 of the microprocessor 250.

The databus 252 also extends to a latch 264 that has output lines extending to a driver DRV_1 connector block 266 which extends to the stepper motor of the implement control valve 170 and a similar connector block 268 which is connected to the stepper motor of the tractor guidance steering valve. As is apparent from the lines extending to the blocks 266 and 268, there are four lines 267 and 269 which control four phases of the stepper motor of each valve 172. The stepper motors are preferably of the type which can provide full and well as ½ step modes of operation by controlling the energization of the coils associated with each of the four phases. By energizing one phase at a time, there can be full step incremental movement of approximately 1.8°, whereas a half step mode alternates between one and two phases cause movement in one or the other directions by an amount of approximately 0.9°. The drive circuitry for each of the stepper motors is illustrated in FIG. 22.

The circuitry to the left portion of FIG. 21a includes a voltage over-protector integrated circuit 270 as well as an off switch 272 that is connected to line 274 that extends to pin 18 of the microprocessor. Depression of the off switch causes an interrupt to occur for the purpose of dropping out a relay to shut off the guidance system and this occurs by an output on line 276 that is connected to the relay and which drops out the relay which results in line 278 becoming de-energized. The databus 252 is also connected to a connector strip 290 which receives address line A0 as well as data lines D0–D7 for providing the signals for the liquid crystal display 162.

The position signal of the forward wand 86' is applied to line 292 while the implement wand signal is applied to line 294. The implement feedback signal from the sensor 60 is applied to line 296 whereas the tractor corresponding signal is applied on line 298. These are voltage signals which are divided by a voltage divider network indicated generally at 300, and these signals are applied to pins 43–46 of the microprocessor 250 which are the inputs for an analog-to-digital conversion functionality.

Turning to FIG. 23, the functional block diagram of the tractor steering control is illustrated with the guidance controller 160 providing electrical signals on line 310 which extends to the guidance steering valve 55. The guidance controller 160 also provides a control signal on line 312 which extends to a control valve 314 that alternatively actuates the guidance steering valve 55 or a tractor steering valve 316 which is provided as part of the tractor itself. The tractor steering valve is controlled by the steering wheel and it has an output lines 318 and 320 for controlling flow to a steering cylinder 322. It should be understood that the steering cylinder 322 actually moves the linkage for turning the wheels of the tractor. If the control valve 314 actuates the guidance steering valve 55, then output lines 324 and 326 extend to the steering cylinder 322. These lines 324 and 326 are connected to lines 318 and 320, respectively, and represent lines A and B of the hydraulic system as previously described. The control valve 314 is basically a directing valve which directs the P and T lines from the tractor's hydraulic system to either the guidance steering valve 55 or the tractor steering valve 316. The control valve 314 is preferably designed so that its failure mode directs the fluid pressure into P and T lines that extend to the tractor steering valve 316 rather than the guidance steering valve 55.

It should also be appreciated that when the guidance steering valve is steering the tractor, it may be that the operator will want to take over the steering of the tractor such as if the end of a row is reached or some anomaly occurs and it is important that the operator of the tractor be able to immediately take control of the steering of the tractor without the necessity of pressing one or more buttons to shut off the automatic guidance system. To this end, a pressure sensing transducing switch 330 is located in either lines A or B which is adapted to provide an electrical signal to the guidance controller 160 when a pressure spike occurs. The pressure transducing switch 330 will cause the electrical signal to be generated in response to the operator grabbing the steering wheel and turning it which causes the steering valve to function like a pump which will increase the pressure and cause the desired operation. Once the signal is produced on line 332, the guidance controller 160 also causes a signal to be generated on line 334 which causes a solenoid 336 to drop out and result in a cylinder 338 to operate to raise the front wand structure 86' out of operation.

When the on switch 272 is depressed, it causes the transistor 275 to be switched on, which turns on the over voltage circuit 270 resulting in a 12 volt output on line 277 which extends to the circuit which provides 5 and 6 volt outputs on lines 279 and 281, respectively, which power up the microprocessor 250. Once the microprocessor has powered up, then line 276 goes high, which causes the transistor 283 to be switched on which holds in the relay. Output line 189 extends to the stepping motors and provides power to them. If the tractor guidance functionality is turned on, pin 21 of the microprocessor goes high which results in line 283 going high which extends to the lower right portion of FIG. 21a. This results in lines 312 being activated which extend to the control valve 314 for activating the control valve 314 to place the guidance steering valve 55 in operation and to activate the solenoid 336 via line 334 to lift the wand structure 86 into its nonoperating position.

With respect to the tractor feedback signal, it preferably comprises a position sensor 340 associated with either the front tie rods of the steering mechanism or a steering linkage component 342 shown diagrammatically in FIG. 23, whose position is indicative of the orientation of the wheels of the tractor.

With respect to the software that is used to operate the microprocessor and the rotary valves that are used in the guidance system, the microprocessor 250 goes through an initialization operation when it is powered up. During initialization, the microprocessor determines if it is being turned on for the very first time or if it has previously been operated. If there are values that have been written in the registers of the memory 254, as well as whether the hydraulic system is operating in an open center or close center mode, the center position of the wands, the feedback sensor center position, delay settings, feedback settings, speed settings and the like, the values will be utilized. Otherwise, the default values will be used, which are values which should operate the system in a nominal manner. The delay setting is the delay between each step of the stepper motor and this is preferably approximately 3 milliseconds. The feedback setting is the percentage of the feedback sensor reading that is used to calculate the position of the total system and this is preferably on the order of 10% to 100%. The speed setting is the maximum amount the valve is permitted to open and thereby determines the fastest speed the cylinder will travel.

The controller has a routine for locating the center position of the spool 172 within the valve 55 and it does so by reading the feedback sensor to detect when the valve is in the closed position. This is accomplished by rotating the valve by the stepping motor in a known direction until the correct movement is detected by the feedback sensor. When the sensor movement is detected, the valve stops moving until the sensor goes across its mid-point. Then the valve rotates in the opposite direction to drive the sensor toward its midpoint again. The mid-point of the sensor is crossed three times and has a settling effect, working the valve closer to its closed position each time. At this point the valve is slowly stepped in the correct direction until there is no motion detected at the feedback sensor. The closed position is now located on the valve in the open center mode. If the control is configured for a closed center operation, the valve is then stepped 50 pulses or 45° from the open center closed position to the closed center closed position. At this time, the number 1000h is stored in a register called SPLX for spool location. SPLX is used to keep track of the spool location while it is in operation.

To locate the center of the feedback sensor, the feedback sensor is read while the valve is in the off position, which is known as a result of the prior running of the spool center locating routine. The feedback sensor is read and the valve is opened to move the sensor arm to its midpoint or center. Once the arm is centered, the number 1000d is assigned to a register called SYS_CNTR or system center. The system is now in balance with the feedback sensor arm at center and the valve in the closed position.

The time or delay between each step of the stepper motor can be measured and this is done by the microprocessor 250. An interrupt is used to measure the time and it is activated by a 16 bit free running counter. When the number of the counter matches the number stored in a dedicated comparator register, the interrupt routine is completed. Immediately after entering the routine, the value of the 16 bit counter is read and an amount is added to the value when stored in the comparator to generate the next interrupt call. The time between interrupts is determined by the delay setting. The routine reads the position of each sensor and examines the feedback percentage and center bias settings to compute the action needed to bring the overall system into balance. All the sensor readings and settings are averaged into one number which is added to or subtracted from the number stored at SYS_CNTR. This resulting number is compared to the value stored in SPLX. The stepper motor is stepped until the number at SPLX matches the SYS_CNTR number or until the maximum distance that the valve can be opened is reached as is controlled by the speed setting. When the two values match, the system is in balance and the valve is closed.

When the valve is stepped open, the delay setting is used but if it needs to close, it is stepped at a faster rate. Otherwise, if the wand structure 86 or 86' call for the unit to move in the opposite direction, it would continue to move in the wrong direction until the valve closed and opened in the correct direction.

With respect to the calibration, a calibration routine reads the highest reading and the lowest reading of the feedback sensor as well as the wand sensor. Due to the fact that the values are stored in the EEPROM memory, calibration is not performed each time it is turned on, but only when it is required. To perform the wand calibration, the sensor is adjusted causing a buzzer to sound when the value read from the sensor matches the ideal center value. This insures that the sensor is adjusted to operate over the mid-range of the magnet in the Hall effect sensor arrangement and not over or under travel the ends. Next, the wands are to be moved to both extremes while the microprocessor saves the highest and lowest readings for storage in the memory 254. The high and low readings are averaged to find the center of the magnet and the true center is added to or subtracted from the ideal value to get the offset value. The offset value is then added or subtracted to the reading from the wand sensor whenever the sensor value is read by the analog-to-digital converter. The offset value is needed because the ideal center number does not always match the true or realistic center. If the magnets were totally linear, the offset value would be unnecessary. The same calibration scheme is also used for the feedback sensor.

The microprocessor also contains software for performing a read sensing operation. In this routine, a conversion of the analog-to-digital converter is performed. After the conversions are completed, the wand and feedback sensor readings are then scaled by using the highest and lowest values read from the sensors in the calibration program operation. Subtracting the lowest value from the highest, the range is determined. The number 240d is then divided by the range to get the scaling factor. Both sensor readings are then multiplied by the scaling factor to obtain scaled values. By doing this, both the scaled sensor values will be from a minimum of zero to a maximum of 240d. This reduces the differences between the two sensor values caused by differences in air gap between the magnet and Hall effect sensor. The overall behavior for one system to another should be equalized using this technique.

With respect to the main program, it contains a menu of selections that is displayed on the LCD display 162. The operator can select and change operating parameters such as speed, delay, feedback, open or closed center system, manual, calibrate sensors or view the main display screen. The program causes the keypads to be read to determine if a change is needed and the program also services the interrupt routine that controls the movement of the system. With this arrangement, the parameters can be changed and can take effect in the next interrupt routine. These parameters are stored in the EEPROM so that they are in effect the next time the unit is turned on.

The display screens include:

| | | | |
|---|---|---|---|
| MENU 1 | SELECT | * | DELAY -------- X |
| | OPTION | * | FEED |
| | FROM | * | FEEDBACK |
| | MENU | * | DISPLAY |
| MENU 2 | SELECT | * | CALIBRATE |
| | OPTION | * | MANUAL |
| | FROM | * | CLOSED |
| | MENU | * | OPENED |
| MAIN | L----*--- | R | (Implement Pos. Dotgraph) |
| SCREEN | L---*---- | R | (Center Biased Dot Graph) |
| | Wand Auto on (Wand Status Displayed) | | |
| | FDB=7 DLY=3 SPD=9 (Value of Settings) | | |

With respect to the center biasing, it is changed by pressing either the left or the right arrow cursor key and the wands are either in OFF or AUTO status, depending if the system is ON or OFF.

From the foregoing detailed description, it should be appreciated that a guidance system has been shown and described which has many desirable attributes in terms of operation and functionality. The system can operate to provide guidance control of a rear following implement as well as providing guidance control of the vehicle, such as a tractor, which is pulling the implement. The present invention also includes a unique proportional servo valve for use in the guidance system. The valve has superior operating characteristics, and provides precise control without exhibiting any tendency for clogging or fouling of the internal ports that often plagues prior art servo valves.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. Apparatus for controlling flow through a hydraulic system of the type which has a pump means adapted to receive fluid from a tank and cause fluid to flow through the system, the system having at least first and second output paths through which fluid can selectively flow from the pump means and return to the tank, said apparatus being adapted to selectively control the flow between the first and second paths, said apparatus comprising:

valve means for controlling the flow of fluid from the pump means to the first and second paths, said valve means having a valve body that includes an inlet means, a first outlet means, a second outlet means and a return means, a rotatable spool means located in said valve body adapted to be selectively oriented in one of first and second operating orientation mode positions, said spool means being adapted to control the flow of fluid in said first path relative to the flow in second path as a function of the angular position of said spool means in each of said first and second operating orientation mode positions, each of said operating orientation mode positions having a nominal center position wherein the flow in said first and second paths is substantially the same, rotation of said spool means in either direction being effective to change at least one of the direction and amount of flow in said first path relative to said second path;

drive means operatively connected to said spool means for angularly positioning said spool means;

means for controlling said drive means to selectively control the angular position of said spool means.

2. Apparatus as defined in claim 1 wherein said drive means comprises an electrical motor having an output shaft connected to said spool means, said electrical motor being adapted to rotate said spool means to a specified rotational position responsive to electrical control signals being applied thereto.

3. Apparatus as defined in claim 2 wherein said drive means comprises a stepping motor adapted to provide a specified rotational position of its output shaft in response to electrical control signals being applied thereto.

4. Apparatus as defined in claim 2 wherein said controlling means comprises a processing means adapted to generate control signals for controlling said drive means.

5. Apparatus as defined in claim 1 wherein said first and second paths extend to first and second double acting hydraulic cylinders, each of which has a rod end and a blank end and a movable piston located therein, said piston having a rod extending through the rod end of the cylinder, said first path extending from said valve means to the rod end of said first cylinder and the blank end of said second cylinder, said second path extending from said valve means to the rod end of said second cylinder and the blank end of the first cylinder, flow of fluid from said valve means to said rod end of said first cylinder and to the blank end of said second cylinder which causes movement of said pistons and flow of fluid from the rod end of said second cylinder and the blank end of said first cylinder to said valve means and to said tank.

6. Apparatus as defined in claim 1 wherein no fluid flow occurs when said valve means is located in said nominal center position when said valve means is in said first operating orientation mode position.

7. Apparatus as defined in claim 1 wherein fluid flows in said first and second paths when said valve means is located in said nominal center position when said valve means is in said second operating orientation mode position.

8. Apparatus as defined in claim 1 wherein said spool means is rotated 45 degrees in said second operating orientation mode position relative to its position in said first operating orientation mode position.

9. Apparatus for controlling flow of hydraulic fluid in a hydraulic system which is one of the open center type and the closed center type, the system having a pump means and a tank, and at least first and second output paths through which fluid can selectively flow from the pump means and return to the tank, said apparatus being adapted to selectively control the flow between the first and second paths, said apparatus comprising:

valve means for controlling the flow of fluid through the first and second paths, said valve means having a valve body that includes an inlet means, a first outlet means, a second outlet means and a return means, a rotatable spool means located in said valve body adapted to be selectively oriented in one of open center and closed center operating mode positions, said spool means being adapted to control the flow of fluid in said first path relative to the flow in second path as a function of the angular position of said spool means in each of said open center and closed center operating mode positions, each of said operating mode positions having a nominal center position wherein the flow in said first and second paths is substantially the same, rotation of said spool means in either direction being effective to change at least one of the direction and amount of flow in said first path relative to said second path;

means operatively connected to said spool means for angularly positioning said spool means.

10. Apparatus as defined in claim 9 wherein said positioning means comprises an operating lever.

11. Apparatus as defined in claim 9 wherein said positioning means comprises drive means having an output shaft connected to said spool means, said drive means being adapted to rotate said spool means to a specified rotational position responsive to electrical control signals being applied thereto, and processing means adapted to generate said control signals for controlling said drive means.

12. Apparatus as defined in claim 11 wherein said nominal center position of said spool means is angularly displaced approximately 45 degrees in said open center operating mode position relative to said nominal center position in said closed center operating mode position.

13. Apparatus for controlling flow of hydraulic fluid in a hydraulic system which is one of the open center type and the closed center type, the system being of the type which includes a pump means, a valve means and a tank, and at least first and second output paths through which fluid can selectively flow from the pump means and return to the tank, the system not having flow through said first and second output paths when the system is in a closed center operating mode and the valve means is in its closed center mode position nominal center position, the system having flow through first and second output paths when the system is in an open center operating mode position and the valve means is in its open center mode nominal center position, said apparatus being adapted to selectively control the flow between the first and second paths, said apparatus comprising:

valve means for controlling the flow of fluid through the first and second paths, said valve means having a valve body that includes an inlet means, a first outlet means, a second outlet means and a return means, a rotatable spool means located in said valve body adapted to be selectively oriented in one of open center and closed center operating mode positions, said spool means being adapted to control the flow of fluid in said first path relative to the flow in second path as a function of the angular position of said spool means in each of said open center and closed center operating mode positions, rotation of said spool means in either direction being effective to change at least one of the direction and amount of flow in said first path relative to said second path;

means operatively connected to said spool means for angularly positioning said spool means.

14. Apparatus as defined in claim 13 wherein rotation of said spool means in a first direction from said nominal center position produces flow of fluid in a first direction in said first path and in a second direction in said second path.

15. Apparatus as defined in claim 14 wherein rotation of said spool means in a second direction from said nominal center position produces flow of fluid in a first direction in said second path and in a second direction in said first path.

16. Apparatus as defined in claim 15 wherein said first direction is in the direction whereby fluid flows from the pump means through said valve means to said first path.

17. A valve means for use in controlling flow of hydraulic fluid in a hydraulic system having first and second paths, which system can operate in either an open center or a closed center mode position, the system having no flow in either one of said first and second paths when the system is in said closed center operating mode position and said valve means is in a nominal center position, the system having flow in both of said first and second paths when the system is in said open center operating mode position and said valve means is in its nominal center position, said valve means comprising:

a valve body that includes an inlet means, a first outlet means, a second outlet means and a return means, a rotatable spool means located in said valve body adapted to be selectively oriented in one of open center and closed center operating mode positions, said spool means being adapted to control the flow of fluid in said first path relative to the flow in said second path as a function of the angular position of said spool means in each of said open center and closed center operating mode positions, rotation of said spool means in either direction being effective to change at least one of the direction and amount of flow in said first path relative to said second path.

18. A valve means as defined in claim 17 further including means for controlling the angular position of said spool means.

19. A valve means as defined in claim 18 wherein said controlling means is adapted to position said spool means in either said open center operating mode position or said closed center operating mode position.

20. A valve means as defined in claim 19 wherein said nominal center position of said open center operating mode is angularly displaced approximately 45 degrees relative to said nominal center position of said closed center operating mode position.

* * * * *

UNITED STATES PATENT AND TRADEMARK OFFICE
CERTIFICATE OF CORRECTION

PATENT NO. : 5,524,525
DATED : June 11, 1996
INVENTOR(S) : Nikkel et al.

It is certified that error appears in the above-indentified patent and that said Letters Patent is hereby corrected as shown below:

Column 6, line 11, after "piston" insert --44.--.

Column 12, line 58, delete "KY 1" and insert --KY_1--.

Column 12, line 60, delete "KY DA" and insert --KY_DA--.

Signed and Sealed this

Twenty-fourth Day of June, 1997

Attest:

BRUCE LEHMAN

Attesting Officer

Commissioner of Patents and Trademarks